(12) United States Patent
Vu

(10) Patent No.: US 8,127,670 B2
(45) Date of Patent: Mar. 6, 2012

(54) BALER PLUNGER DRIVE SYSTEM

(75) Inventor: Thomas H. Vu, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 158 days.

(21) Appl. No.: 12/349,746

(22) Filed: Jan. 7, 2009

(65) Prior Publication Data
US 2010/0170407 A1 Jul. 8, 2010

(51) Int. Cl.
B30B 1/26 (2006.01)
(52) U.S. Cl. ........................................ 100/179
(58) Field of Classification Search .................. 100/177, 100/179, 280, 282; 56/432, 436, 440, 443, 56/446, 341, 343
See application file for complete search history.

(56) References Cited

U.S. PATENT DOCUMENTS

| | | | |
|---|---|---|---|
| 2,352,388 A * | 6/1944 | Jones | 100/100 |
| 2,478,324 A * | 8/1949 | Russell | 56/364 |
| 3,426,672 A * | 2/1969 | Nolt | 100/4 |
| 3,513,651 A * | 5/1970 | Hollyday et al. | 56/343 |
| 3,525,302 A * | 8/1970 | Eberly et al. | 100/179 |
| 4,083,441 A | 4/1978 | Young | |
| 5,064,037 A | 11/1991 | Long, Jr. | |
| 5,226,356 A * | 7/1993 | Schrag et al. | 100/41 |
| 5,768,872 A | 6/1998 | Von Allworden | |
| 2006/0117876 A1* | 6/2006 | Lepres et al. | 74/7 E |

FOREIGN PATENT DOCUMENTS

| | | |
|---|---|---|
| DE | 3638792 | 5/1988 |
| FR | 2749130 | 12/1997 |
| GB | 2187417 | 9/1987 |
| SU | 580857 | 11/1977 |
| SU | 976890 | 12/1982 |

OTHER PUBLICATIONS

European Search Report, 4 Pages, Mar. 17, 2010.
Eurasian Search Report, May 25, 2010, 3 Pages.

* cited by examiner

*Primary Examiner* — Jimmy T Nguyen

(57) ABSTRACT

A baler for making parallelepiped bales includes a planetary gear drive arrangement including a planet carrier coupled through an overrunning clutch for driving an output shaft which extends cross wise to a forward end of an elongate baling chamber. A plunger is mounted for reciprocating within the baling chamber for compressing crop into a bale, with a crank shaft arrangement being mounted for rotation with the output shaft and being coupled to the plunger by a connecting rod arrangement. When the gear drive arrangement is operating for effecting a compression stroke of the plunger, the overrunning clutch operates in a driving mode. When the gear drive arrangement is operating for effecting a reverse stroke of the plunger, the overrunning clutch operates in an overrunning mode so long as compressed crop is exerting a force on the plunger.

2 Claims, 2 Drawing Sheets

US 8,127,670 B2

BALER PLUNGER DRIVE SYSTEM

FIELD OF THE INVENTION

The present invention relates generally to balers for producing large parallelepiped bales, commonly called large square balers, and more specifically relates to a plunger drive system for such balers.

BACKGROUND OF THE INVENTION

The most common plunger drive system for large square balers is a system which converts the rotational power from the towing tractor power take-off, via a baler plunger drive gearbox, to axial forces transferred to a baler plunger by a connecting rod arrangement that is coupled between a crank arm arrangement and the plunger for effecting reciprocating plunger movement within the bale-forming case so as to compress crop material, such as straw or hay, into desired densely compacted bales for ease of shipping and handling.

One of the drawbacks associated with current plunger drive systems is that, at the end of the forward or compressing stroke of the baler plunger, as the connecting rod assembly goes over center and the plunger begins its reverse stroke, the compressed crop material pushes back against the plunger, causing a reverse load to be applied on the plunger, which is transmitted through the meshed gears within the gearbox. This creates what is commonly known as reverse bending on the meshing gear teeth. In addition, due to the required backlash in the meshed gears, this reverse loading, which happens each cycle of the connecting rod assembly, creates impact loadings on all of the meshed gears. This reverse impact loading not only causes a significant reduction in the design life of the gears in the plunger drive gearbox, but also contributes to noise heard by, and vibrations felt by, operators, giving rise to complaints by some operators who are discomfited by the noise and vibrations.

Still another drawback associated with current plunger drive systems is that the plunger action is directly related to the timing of certain gear meshes, meaning that the same set of gear teeth will see the same loads every cycle. This makes it necessary to design the gear ratios so as to present meshed gears having a hunting gear tooth so as to lessen gear wear.

The problem to be solved then is that of providing a baler plunger drive system which reduces the magnitude of reverse loading imposed on the meshed gears of the plunger drive gearbox and which eliminates the need for designing meshed gear sets to have a hunting tooth.

SUMMARY OF THE INVENTION

According to the present invention, there is provided an improved baler plunger drive system.

An object of the invention is to provide a baler plunger drive system which overcomes the above-noted drawbacks of the known plunger drive systems.

The foregoing object is overcome by providing a plunger drive system including a gear drive having an output coupled to an output shaft by an overrunning clutch, the output shaft carrying the crank arm arrangement.

DESCRIPTION OF THE PREFERRED EMBODIMENT

Figure 1:
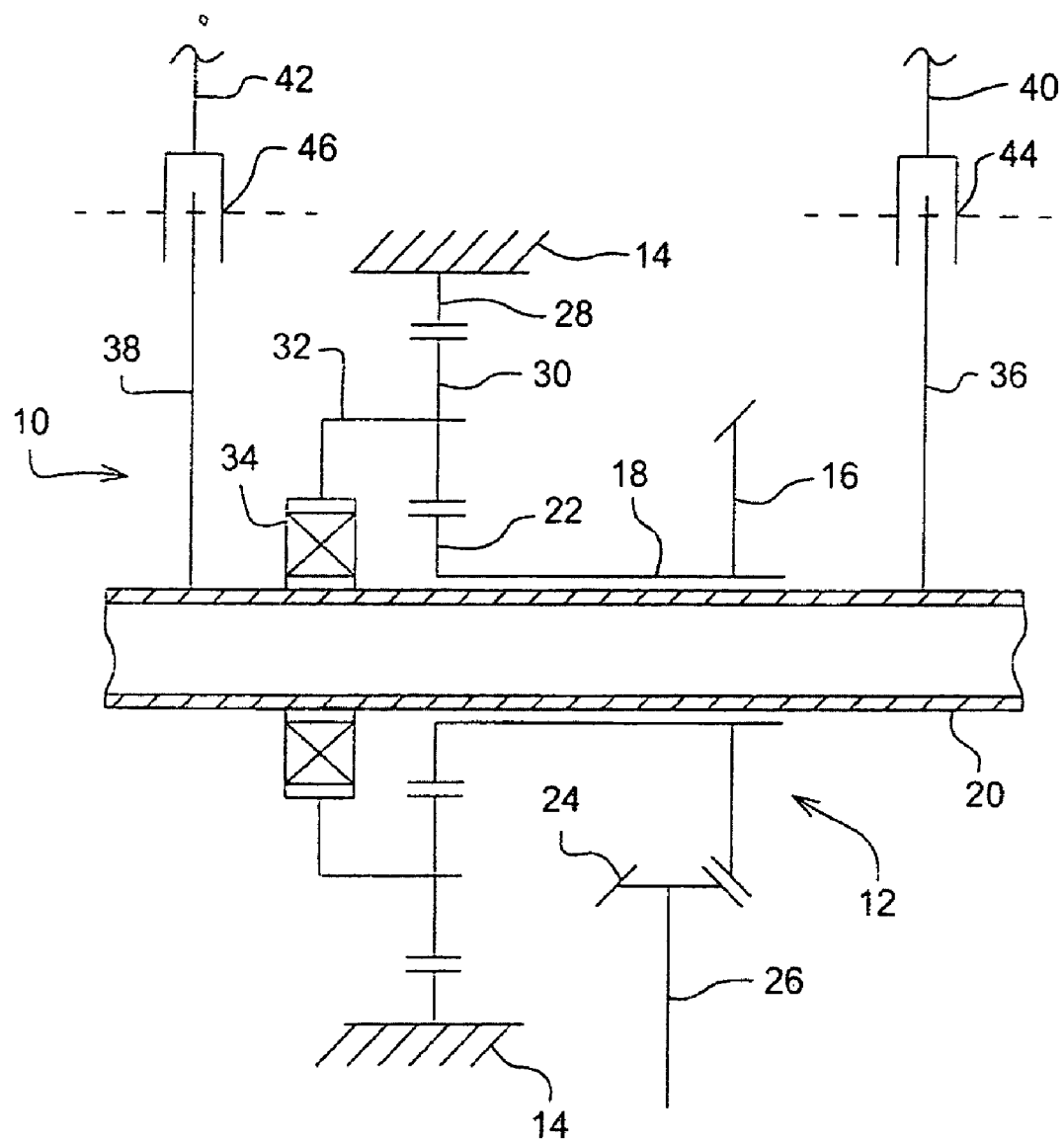
FIG. 1 is a schematic top view of a baler plunger drive system

Referring now to FIG. 1, there is shown a baler plunger drive 10 including a speed reducing system 12, which may take any known form, but here is shown as including a planetary gear set. The speed reducing system 12 would normally be enclosed within in a gear case or housing, a part of which is indicated schematically at 14. The speed reducing system 12 includes a bevel ring gear 16 fixed to a first end region of a hollow shaft 18 mounted for rotating freely about an output shaft 20 and having a sun gear 22 fixed to a second end thereof. A bevel pinion 24 is carried by an input shaft 26 that is adapted for being coupled to the PTO of a towing tractor, (not shown). An annular gear 28 is fixed to the housing 14 and meshed with planetary gears 30 mounted for rotation within a carrier 32 having a hub encircling, and being coupled by an overrunning clutch 34 for driving, the output shaft 20.

Fixed for rotation with the output shaft 20 is a crank arm assembly comprising first and second crank arms 36 and 38 respectively located at opposite end regions of the output shaft that are exteriorly of the gear housing 14. A connecting rod assembly comprising a pair of connecting rods 40 and 42 are respectively pivotally coupled to the crank arms 36 and 38 at pivot connections 44 and 46.

Figure 2:
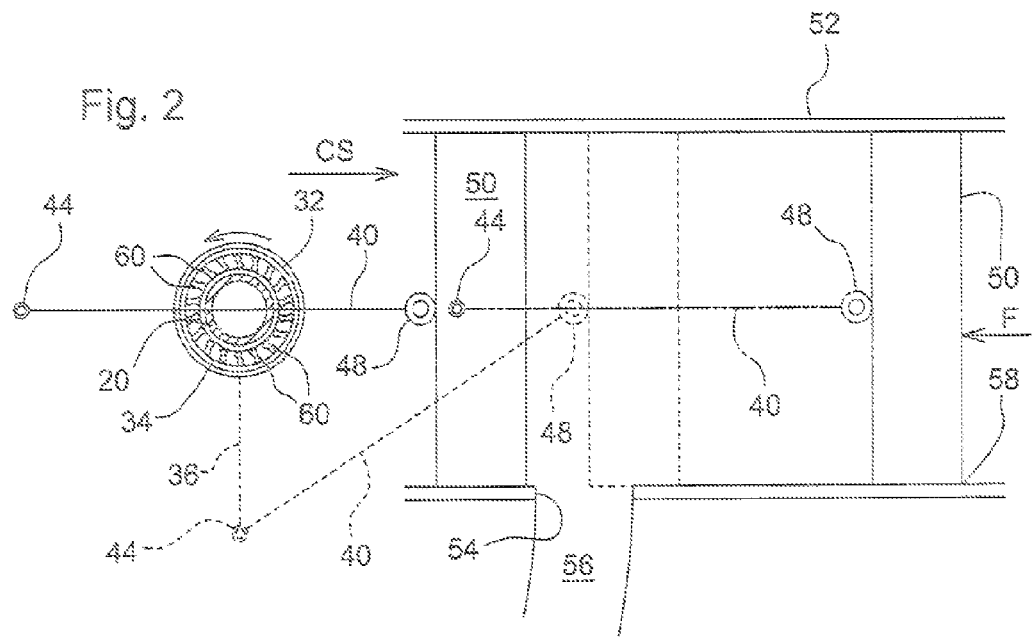
FIG. 2 is a schematic left side view of the carrier output, overrunning clutch and output shaft, with nine o'clock, six o'clock and three o'clock positions of a forward stroke portion of the plunger drive cycle being respectively shown in solid, dashed and chain lines, with the carrier acting through the overrunning clutch to drive the output shaft.

Referring now to FIG. 2, it can be seen that the connecting rods 40 and 42 (only connecting rod 40 being visible) are pivotally coupled, as at pivot connections 48, to a baler plunger 50 that is received for being reciprocated within a baling chamber or case 52. Coupled to an opening 54 provided in, and extending across, a bottom wall of the chamber 52 is a pre-compression chamber 56 of which only an upper end section is shown. In a manner well-known in the art, a lower forward end of the chamber 56 receives crop material from a crop pick-up, with this crop material being compressed within the chamber 56 by a packer until it forms a charge of pre-selected density, whereupon the charge is swept into to baling chamber 52 by a stuffer.

The charge of crop material is stuffed into the baling chamber at a beginning of the plunger drive cycle wherein the crank arms 36 and 38 are located at a nine o'clock position, as shown in solid line, with the plunger 50 positioned to the left of the opening 54 and being driven rightward in a compression stroke direction indicated by the arrow CS. As the crank arms 36 and 38 reach their six o'clock position, as indicated in dashed lines, the plunger 50 advances to a position approximately halfway across the inlet opening 54. As the crank arms 36 and 38 rotate further, the plunger 50 will eventually compress the crop charge against the left end of a bale being formed, with this compression continuing until the crank arms arrive at the three o'clock position, as indicated in chain lines, with the plunger 50 then being located at a rightmost location 58 and having a resistant force, indicated by an arrow F (FIGS. 2 and 3), acting against a rightward face of the plunger. It is to be noted that during this entire time, sprag elements 60 of the overrunning clutch 34 will be in a driving orientation, whereby the output shaft 20 is driven by the planet carrier 32.

Figure 3:
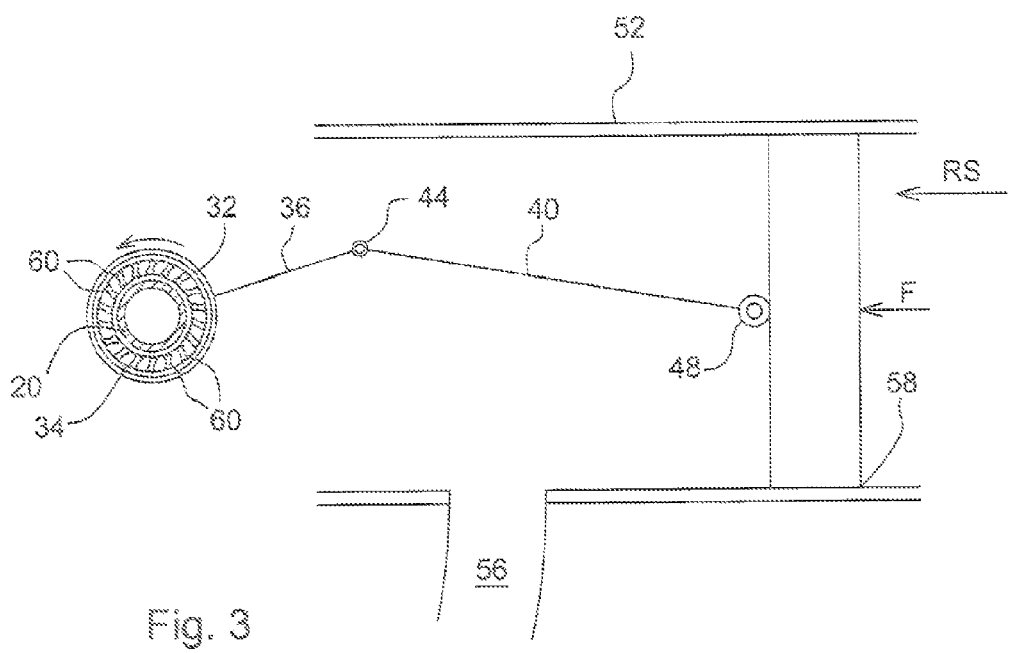
FIG. 3 is a view like FIG. 2 but showing a reverse stroke portion of the plunger drive cycle where the direction of the plunger has just reversed with the rebounding compressed crop driving the plunger causing an overrunning condition in the overrunning clutch.

Referring now to FIG. 3, there the crank arms 36 and 38 are shown in a position just beyond the three o'clock position, with the plunger 50 beginning a reverse stroke in the direction RS. As the plunger 50 initially moves to the left from the rightmost position 58, the compressed crop material rebounds and pushes against the plunger 50 with the force F which diminishes as the plunger 50 moves leftward. During the time when the force F exists, it will be transferred to the overrunning sprag elements 60 of the overrunning clutch 34 to assume an attitude establishing an overrunning condition so that no reverse loading of meshed gear teeth takes place in the various meshed gear sets in the plunger drive.

Once the force F no longer exists, the overrunning clutch will assume its driving condition, shown in FIG. 1.

Having described the preferred embodiment, it will become apparent that various modifications can be made without departing from the scope of the invention as defined in the accompanying claims.

The invention claimed is:

1. In a baler for forming parallelepiped bales of crop material including an elongate baling chamber having a rectangular cross section and a central longitudinal axis, a plunger mounted in said baling chamber for reciprocating along said axis in a first end region of said chamber for compressing crop material towards a second end region of said chamber, a drive assembly coupled to said plunger for causing reciprocation of said plunger and including an output shaft extending crosswise to said longitudinal axis and being spaced from said first end region of said baling chamber, said drive assembly further including a gear drive arrangement including an input shaft adapted for being coupled to a tractor power take-off, an output gear arrangement coupled to said output shaft, a crank arm assembly fixed for rotation with said output shaft and a connecting rod assembly coupled between said crank arm assembly and said plunger for effecting reciprocation of said plunger when said output shaft is rotated, the improvement comprising: said drive assembly including an overrunning clutch coupled between said output gear arrangement and said output shaft and being operable for operating in a driving mode, when said crank arm assembly is moving within a range of positions causing a compression stroke of said plunger through the action of said connecting rod assembly resulting in said plunger being advanced toward said second end region of said chamber, and being operable for operating in an overrunning mode, when said crank arm assembly is moving within a range of positions causing a reverse stroke of said plunger and wherein crop material compressed during said compression stroke is rebounding and imposing a force on said plunger in a direction away from said second end region of the chamber.

2. The combination, as defined in claim 1, wherein said gear drive arrangement includes a planetary gear arrangement, with said output gear arrangement including a plurality of planetary gears together with a carrier joined to an outer race of said overrunning clutch and with said output shaft being joined to an inner race of said overrunning clutch.

* * * * *